Patented Mar. 11, 1947

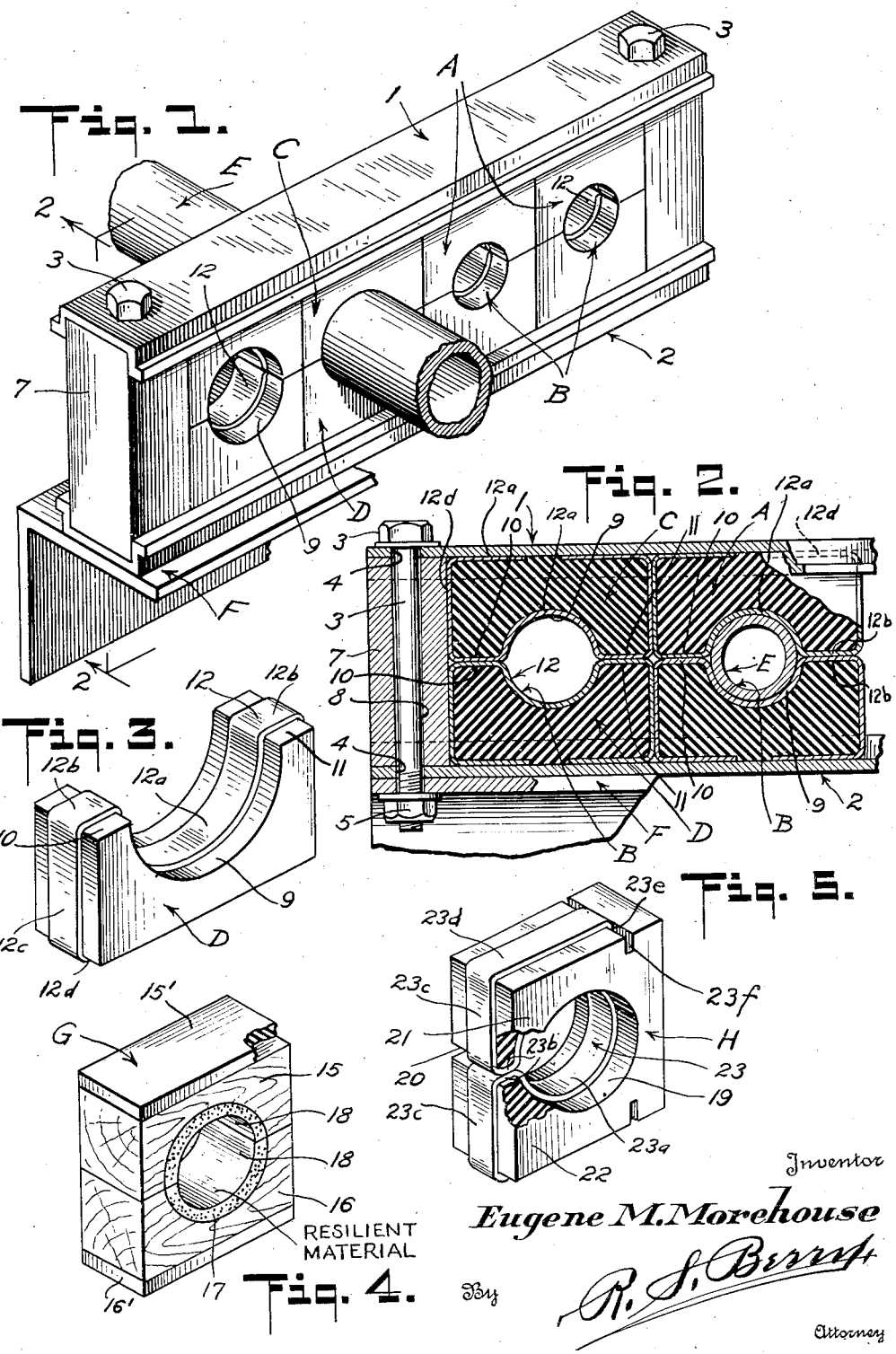

2,417,260

UNITED STATES PATENT OFFICE 2,417,260

SECTIONAL SUPPORT FOR CONDUITS

Eugene M. Morehouse, Tujunga, Calif., assignor to Adel Precision Products Corp., a corporation of California Application August 18, 1942, Serial No. 455,195

2 Claims. (Cl. 174—135)

This invention relates to conduit supports which are known in this art as "blocks" and provide cushioned and vibration absorbing seats for supporting a group of metal conduit lines in aircraft, there being conductive bonding means carried by such blocks for "grounding" the conduits to the metallic frame structure of the aircraft on which the blocks are mounted.

Heretofore conduit supporting blocks have been made of a longitudinally divided elongated body portion between divisions or sections of which the conduits are clamped. In the majority of cases the conduits of each block supported group are of different diameters necessitating the formation of transverse conduit receiving grooves or channels of predetermined sizes in the opposed faces of two sections so that the complementary grooves or channels will form holes or slots of given sizes which receive the conduits and provide for the clamping and holding thereof in the block, in good contact with the bonding means.

Should the bonding means or a seat portion for one of the conduits become deranged, damaged or impaired it is necessary to disassemble the entire block to effect the repair or to replace a longitudinal division or both longitudinal divisions of the block or replace the bonding means thereon. Moreover the substitution of a conduit having a different diameter than originally provided for requires the substitution of a complete new longitudinal division of proper size, or that the original section or division be reconstructed to fit the substituted conduit.

An object of the present invention is to provide a conduit support which comprises a plurality of independent conduit supporting block-like units each having a conduit embracing seat and separable portions whereby the conduit may be mounted in said seat, there being a means for releasably clamping said units together in an aligned group whereby the interchanging of the units or parts thereof for repair purposes or to accommodate conduits of different diameters may be much more quickly, easily and economically carried out than heretofore, and a more flexible device provided as to its assembly and installation.

Another object of the present invention is to provide a conduit supporting block in which an elongated body thereof is divided both longitudinally and transversely to form a series of contiguous but independent conduit supporting units each affording a cushioned seat and having a bonding means and being independently removable and replaceable whereby the objections and difficulties heretofore encountered are eliminated and the assembly of the block and its installation are greatly facilitated, particularly in making up subassemblies of blocks and conduits before installation in the aircraft.

Another object of my invention is to provide a block of unit construction such as described which makes it possible to use unit sections of cushioning material such as wood or plastic having inserted cushion seats and thereby conserving strategic material, or unit sections of solid cushioning material.

A further object of my invention is to provide a conduit supporting block such as hereinbefore described in which the individual conduit supporting units or blocks are held in a simple frame and so constructed and arranged as to insure a better cushioning and vibration absorbing action, as well as a more effective and reliable bonding action per conduit and as to the group of conduits, then heretofore.

Another object of my invention is to provide a conduit supporting block of the character described in which the bonding means for the individual conduit supporting and bonding units are arranged to effectively bond the units to one another as well as to bond each unit to metal elements of the frame in which said units are held and by which the units are clamped on the conduits and supported on the metal structure of the aircraft.

With the foregoing objects in view, together with such other objects and advantages as may subsequently appear, the invention resides in the parts and in the combination, construction and arrangement of parts hereinafter described and claimed, and illustrated by way of example in the accompanying drawing in which:

Fig. 1 is a perspective view of a conduit supporting block embodying my invention:

Fig. 2 is an enlarged fragmentary sectional view taken on the line 2—2 of Figure 1:

Fig. 3 is a perspective view of one half of one of the individual supporting conduit units:

Fig. 4 is a perspective view of a modified form of the invention:

Fig. 5 is a perspective view of another modified form of the invention:

As shown in detail in the accompanying drawing my improved conduit support includes primarily a compact group of independent block-like conduit supporting units A each having a conduit embracing seat B and separable portions C and D which permit of the mounting of a conduit such as the one E in Fig. 1, within the seat.

Means is provided for clamping the units on the conduits and releasably holding them together in a compact aligned group in contact with one another, also for mounting this group as a unit on metal structural part of an aircraft such as the part F seen in Figs. 1 and 2. Such a clamping means makes it possible, together with the separate conduit supporting units, to individually remove and replace the units without completely disassembling the device or necessitating replacement of large and comparatively expensive parts when repairs per conduits seat are required and when conduits of different diameters than original mounted in the block, are substituted.

As here provided the means for clamping the units on the conduits and the units together as a group includes elongated rigid metal frame members 1 and 2 of channelled cross section between which the units A are mounted. A bolt 3 is inserted through an opening 4 near each end of these frame members and through the supporting structure F as shown in Fig. 2, there being a nut 5 turned on said bolt against the structure F to clamp the frame members on the units A and to secure the device as a whole to said supporting structure.

Spacer blocks 7 of wood or other rigid material are mounted between the frame members 1 and 2 at the ends thereof and have openings 8 therethrough for the bolts. These spacer members may be employed to limit the clamping action of the frame members 1 and 2 relative to the units A and form with the frame members 1 and 2 an adjustable frame structure for holding the units A in line as a compact group.

As shown in Figs. 1, 2 and 3 the units A are formed of synthetic rubber or similar elastic and resilient cushioning material to provide for a vibration absorbing and cushioned support of the conduits. Each unit as shown in Figs. 1, 2 and 3 is made of like halves which comprise the separable portions C and D. The opposed faces of said sections are formed with transverse grooves or channels 9 of semi-circular form which co-act to produce the circular seat B for a conduit.

The channels or grooves 9 are so formed as to provide flat surfaces 10 and 11 on opposite sides of the channels and which abut when the two sections of the units are brought together.

As a means for bonding the conduit to each unit A to the metal structure F of the aircraft to discharge static electricity without producing dangerous sparks or creating radio interference, I provide a thin flexible metallic bonding strip 12 in each half or section of each unit. These bonding strips have intermediate portions 12a lying in and conforming to the channels or grooves for contact with the conduit, portions 12b lying on the opposed flat surfaces 10 and 11, portions 12c extending around the sides of the half sections, and end portions 12d overlying the faces of the half section which are opposed to the metal frame.

The portions 12b in abutting serve to bond together the two sections of the units, the portions 12c abut and thereby bond the units to one another while the end portions 12a in contacting the metal frame members 1 and 2 bond the conduits to the metal structure F.

It should be noted that the resilient units A in abutting one another and being clamped and placed under compression by and between the frame members 1 and 2 and the end blocks 7, will afford a much more effective cushioning and vibration absorbing action than possible with the full length longitudinally divided blocks as heretofore employed in this art there being greater freedom and flexibility by reason of the individual units.

I may as shown in Fig. 4 use a wooden, plastic or similar inelastic block unit C in which the separable portions are half sections 15 and 16, each provided with a transverse channel or groove 17 so that when the sections are brought together a circular opening or seat is provided for the conduit. A semi-circular cushion strip 18 of elastic and resilient material lines each groove or channel and is cemented therein so that a conduit encircling cushion is provided when the two sections are brought together. This form of unit provides for a saving in strategic cushioning material yet affords an effective vibration absorbing action. Units of this type are used in the same manner as those shown in Figs. 1 and 2. A bonding strip not shown may be employed in the same manner as shown in Fig. 3 for each section. I may as here shown employ the cushion 15' and 16' of rubber or the like cemented on the outer faces of the sections 15 and 16 to increase the cushioning action.

Another modified form of this invention is shown in Fig. 5 and comprises a one piece block unit H of synthetic rubber or like cushioning material having a circular conduit receiving opening or seat 19, centrally thereof and provided with a slot 20 extending from one edge of the unit into the opening to define separable portions 21 and 22. These portions are sprung apart to permit the conduit to be engaged in the opening 19 and will spring back together when released thereby enclosing the conduit.

As here shown this block is provided with a bonding strip 23 which has an intermediate loop portion 23a lining the opening 19, opposed portions 23b extending through the slot 20, portions 23c extending in opposite directions from the slot 20 over a side edge of the unit; and end portions 23d which overlie the top and bottom edges of the unit and bent inward as at 23e into slots 23f to hold the strip securely in place. This form of unit is used in the same manner as those shown in Figs. 1 and 2.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a support for a group of conduits, a plurality of independent conduit supporting units each in the form of a block having a conduit receiving opening and separable portions movable to permit of mounting the conduit in said opening and so that the block may surround and support said conduit, and means for releasably clamping said units together in an aligned group with the units clamped on the conduits, including rigid elongated metal frame members between which the group of units are mounted, fastenings securing said frame members together to hold the group of units therebetween, and independent electrically conductive strips carried by said units within said openings for contact with the conduits therein and extended to lie between the units and the metal frame members in contact with the latter and so that portions of said strips extend at right angles to said frame members and lie between the units in contact with one another to bond the units to one another.

2. In a support for a group of conduits, a plurality of independent conduit supporting units each in the form of a block having a conduit embracing seat and separable portions whereby a conduit may be mounted in said seat, means for releasably clamping said units together in a compact group including metal frame members between which said units are held, and a separate electrically conductive bonding strip carried by each unit for bonding the conduit therein to at least one of said metal frame members, said bonding strip lying in conformity with at least a part of the seat and extending at a right angle to said frame members between said separable portions and around outer surfaces of the unit for contact with said one metal frame member and the bonding strip of the next adjacent unit to bond the units to one another.

EUGENE M. MOREHOUSE.

REFERENCES CITED

The following references are of record in the file of this patent:

UNITED STATES PATENTS

| Number | Name | Date |
| --- | --- | --- |
| 1,929,700 | Malone | Oct. 10, 1933 |
| 2,298,560 | Harrison | Oct. 13, 1942 |
| 2,333,145 | Webb | Jan. 4, 1944 |
| 2,215,283 | Adler | Sept. 17, 1940 |
| 1,952,695 | Webb et al. | Mar. 27, 1934 |
| 2,227,528 | Adler | Jan. 7, 1941 |
| 678,042 | Sargent | July 9, 1901 |
| 525,708 | Herrick | Sept. 11, 1894 |
| 426,193 | Munsie | Apr. 22, 1890 |